(12) United States Patent
Choi et al.

(10) Patent No.: US 12,103,801 B2
(45) Date of Patent: Oct. 1, 2024

(54) RAW MATERIAL SUPPLY DEVICE FOR SEPARATOR OF SECONDARY BATTERY

(71) Applicant: LG ENERGY SOLUTION, LTD., Seoul (KR)

(72) Inventors: Dongsoon Choi, Daejeon (KR); Sang Don Lee, Daejeon (KR); Woong Ki Kim, Daejeon (KR); Doseong Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 148 days.

(21) Appl. No.: 18/017,737

(22) PCT Filed: Apr. 15, 2022

(86) PCT No.: PCT/KR2022/005454
§ 371 (c)(1),
(2) Date: Jan. 24, 2023

(87) PCT Pub. No.: WO2022/220637
PCT Pub. Date: Oct. 20, 2022

(65) Prior Publication Data
US 2023/0264913 A1      Aug. 24, 2023

(30) Foreign Application Priority Data
Apr. 15, 2021   (KR) .......................... 10-2021-0048930

(51) Int. Cl.
*B65H 19/18*       (2006.01)
*H01M 50/403*    (2021.01)

(52) U.S. Cl.
CPC ...... *B65H 19/1852* (2013.01); *H01M 50/403* (2021.01); *B65H 2301/44336* (2013.01); *B65H 2301/4621* (2013.01); *B65H 2301/46327* (2013.01)

(58) Field of Classification Search
CPC .................................................. B65H 19/1852
See application file for complete search history.

(56) References Cited

FOREIGN PATENT DOCUMENTS

| IN | 10546/DELNP/2014 A | 8/2015 |
|---|---|---|
| JP | 9-194090 A | 7/1997 |
| JP | 2005-298162 A | 10/2005 |
| JP | 2013-43660 A | 3/2013 |
| JP | 2015-15115 A  * | 1/2015 |

(Continued)

OTHER PUBLICATIONS

International Search Report (PCT/ISA/210) issued in PCT/KR2022/005454, dated Jul. 22, 2022.

*Primary Examiner* — Jeffry H Aftergut
(74) *Attorney, Agent, or Firm* — Birch, Stewart, Kolasch & Birch, LLP

(57) ABSTRACT

A raw material supply device for a separator of a secondary battery includes a conveyor for causing an end portion of the supplied raw material to move to an end portion of the existing raw material; and a bonding unit for bonding the end portion of the supplied raw material and the end portion of the existing raw material. The raw material supply device may automatically bond the existing raw material and the supplied raw material by using ultrasonic waves with respect to the raw material for the separator of the secondary battery in the form of a roll.

14 Claims, 8 Drawing Sheets

(56) References Cited

FOREIGN PATENT DOCUMENTS

| | | |
|---|---|---|
| KR | 10-0915269 B1 | 9/2009 |
| KR | 10-2014-0105960 A | 9/2014 |
| KR | 10-1705191 B1 | 2/2017 |
| KR | 10-2018-0069390 A | 6/2018 |
| KR | 10-1873198 B1 | 8/2018 |
| KR | 10-1892583 B1 * | 8/2018 |
| KR | 10-2020-0051053 A | 5/2020 |
| KR | 10-2021-0009009 A | 1/2021 |

* cited by examiner

【Figure 1】
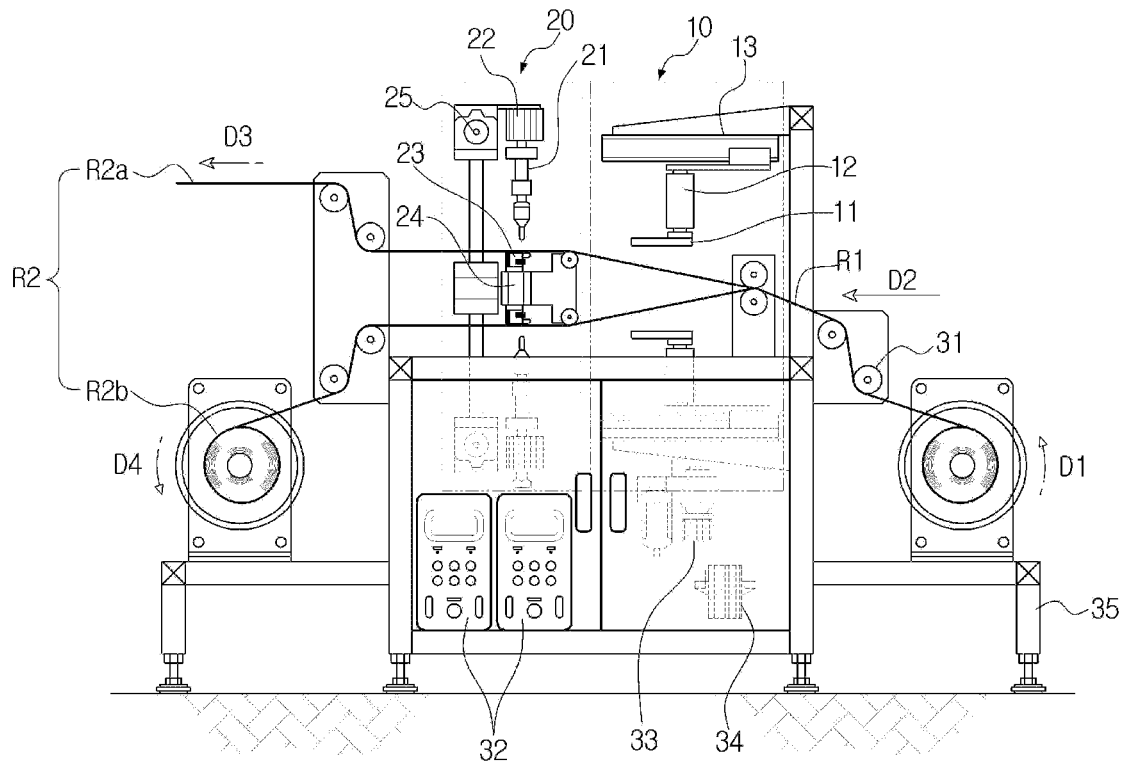
【Figure 2a】
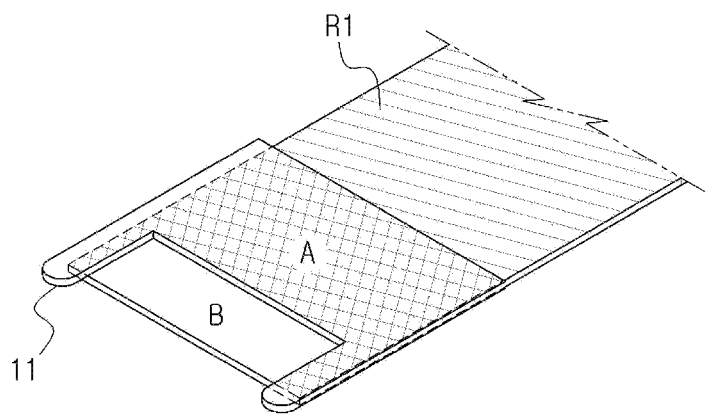

【Figure 2b】
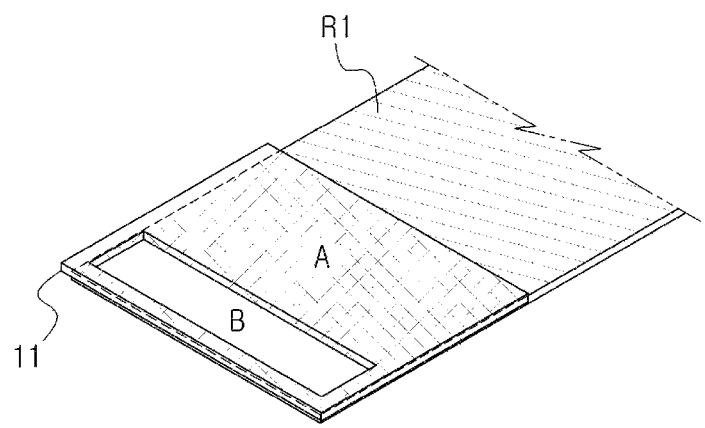
【Figure 2c】
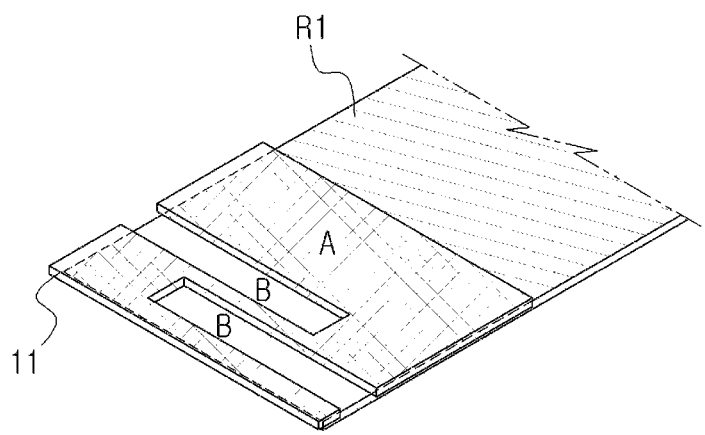

[Figure 3a]
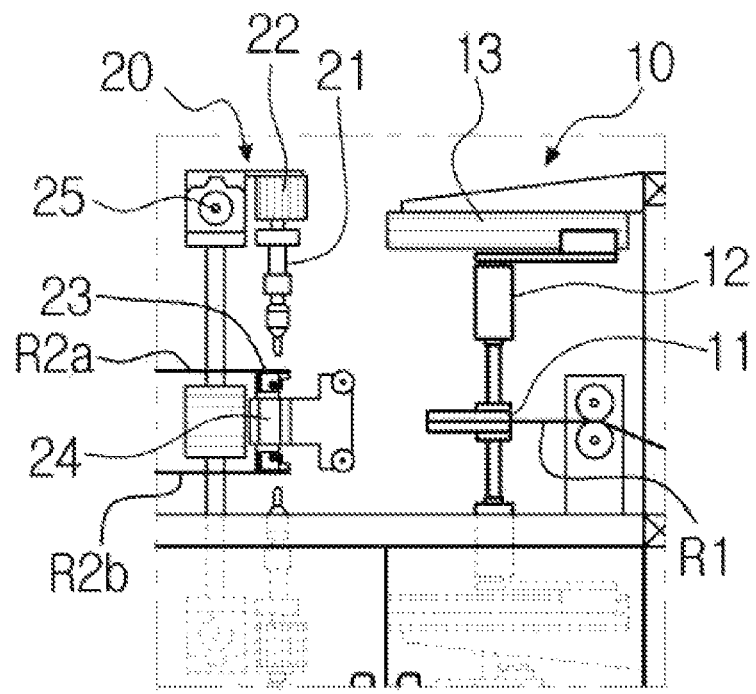

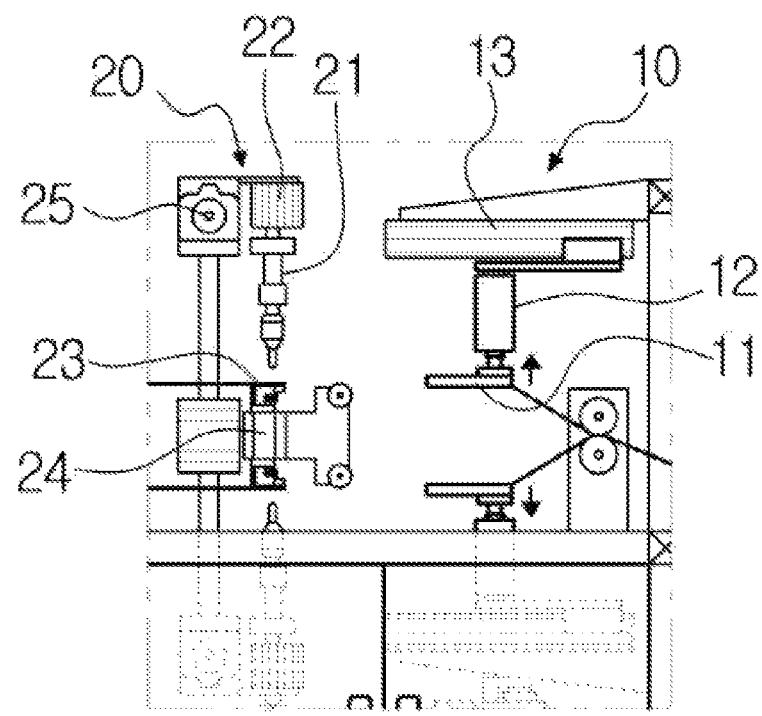
【Figure 3b】

[Figure 3c]
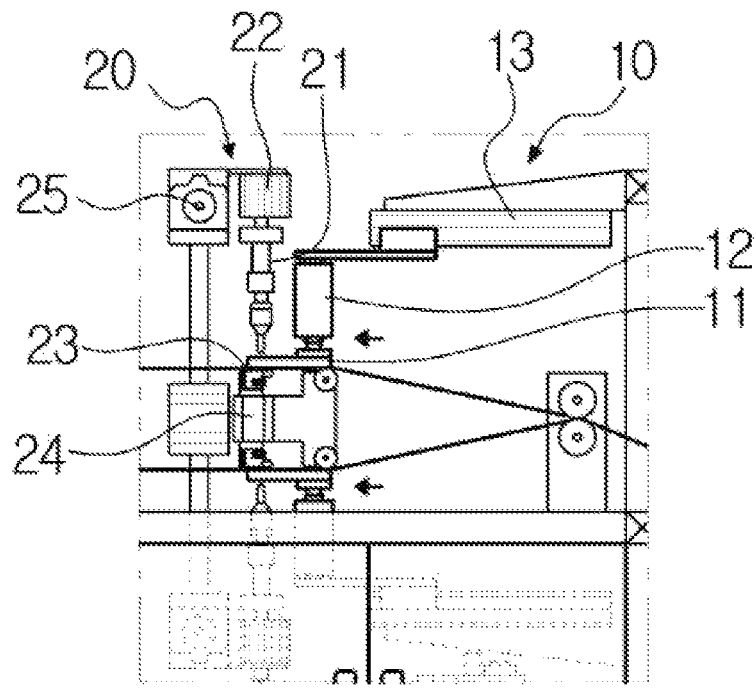

[Figure 3d]
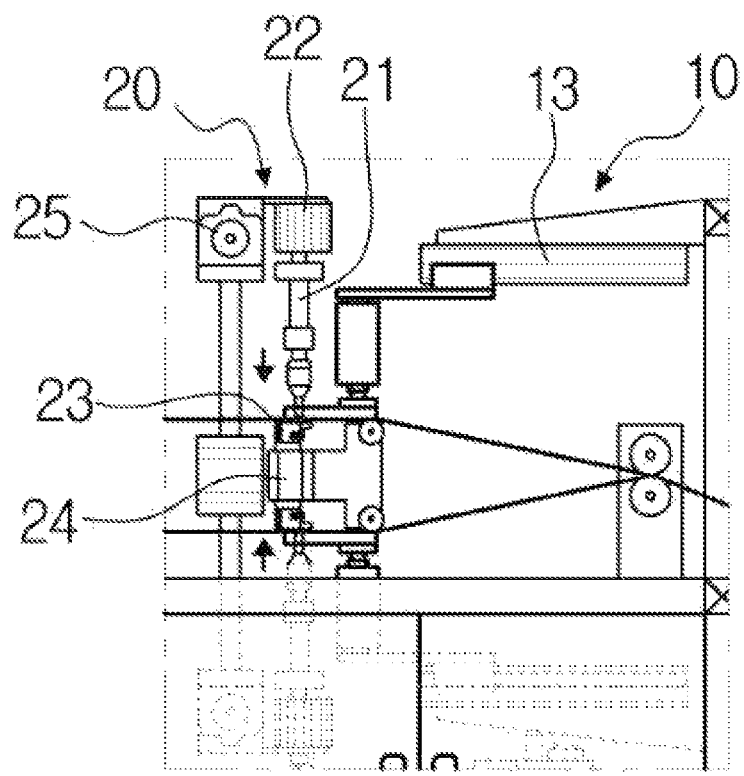

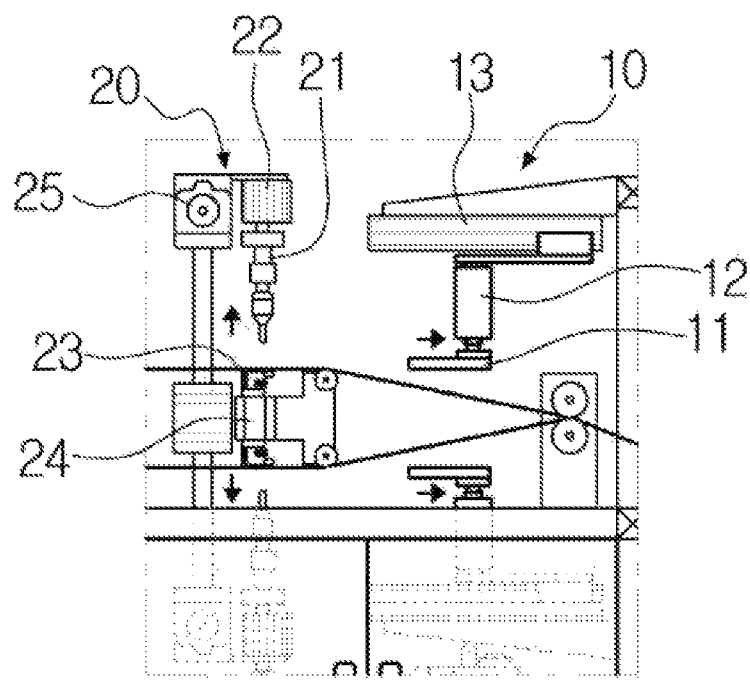
【Figure 3e】

【Figure 4a】
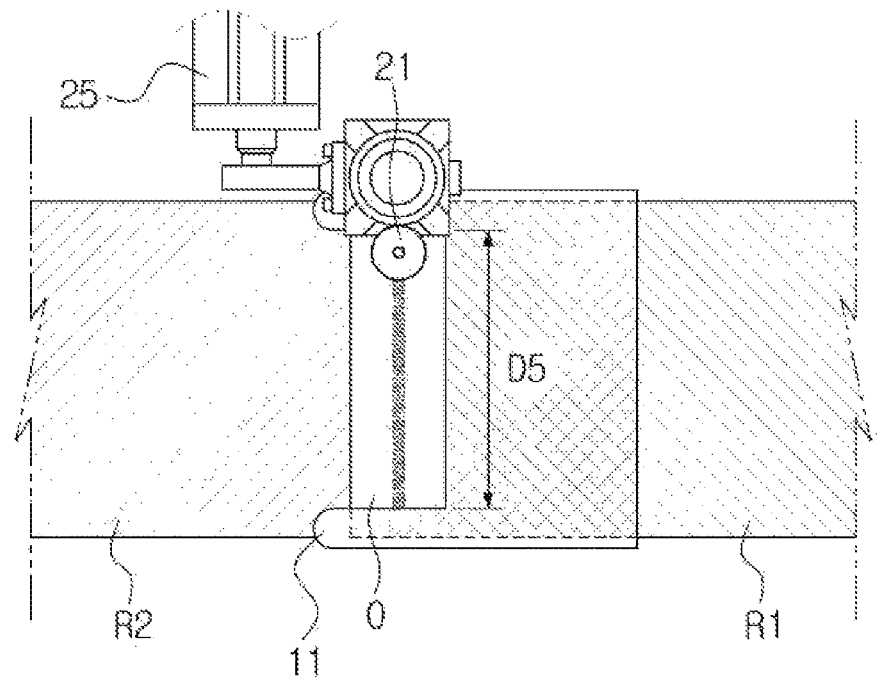
【Figure 4b】
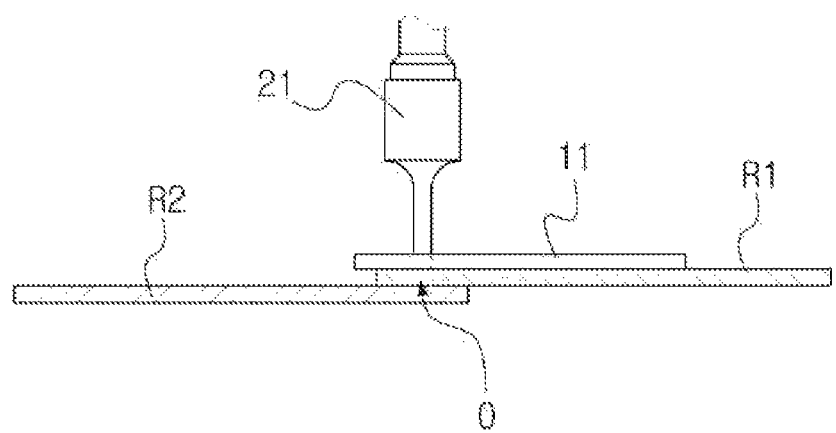

RAW MATERIAL SUPPLY DEVICE FOR SEPARATOR OF SECONDARY BATTERY

TECHNICAL FIELD

The present invention relates to a raw material supply device for a separator of a secondary battery. Specifically, the present invention relates to an apparatus capable of continuously supplying a raw material by automatically bonding the end portion of a raw material in use with the end portion of a new raw material, in connection with a roll type raw material for the separator of a secondary battery.

The present application claims the benefit of priority based on Korean Patent Application No. 10-2021-0048930 filed on Apr. 15, 2021, the entire contents of which are incorporated herein by reference.

BACKGROUND ART

A secondary battery is a chemical battery that can be used semi-permanently by continuously repeating charging and discharging using an electrochemical reaction, which is classified into a lead-acid battery, a nickel-cadmium battery, a nickel-hydrogen battery, and a lithium secondary battery. Among them, a lithium secondary battery has superior voltage and energy density characteristics compared to other batteries, thereby leading the market for secondary batteries, which is divided into a lithium-ion secondary battery using a liquid electrolyte and a lithium-ion polymer secondary battery using a solid electrolyte, according to the type of electrolyte. This lithium secondary battery is composed of a positive electrode, a negative electrode and an electrolyte, and also the separator is generally positioned between the positive electrode and the negative electrode to prevent a short circuit between the positive electrode and the negative electrode due to their direct contact.

In this separator, various resins comprising polyolefin-based polymer resins such as polyethylene and polypropylene are used as raw materials, and the raw material is mainly supplied in the form of a roll. When supplying a new raw material due to the exhaustion of the raw material in use, the raw material can be continuously supplied by bonding the end portion of the raw material in use and the end portion of the new raw material, wherein a bonding tape was mainly used for bonding the raw material in use and the new raw material. However, in this case, there is an additional requirement in the entire process due to the introduction of the new material called a bonding tape, and there was a problem that the bonding area was not uniformly fixed with a certain strength due to the adhesive force of the bonding tape, the bonding position, and the like.

In addition, when winding the raw material in order to supply the roll type raw material, it is often supplied with a protective film made of a material such as polyethylene terephthalate (PET) attached to one side of the raw material, in order to separate and protect the raw material. However, before bonding the raw material in use and the new raw material, this protective film must also be removed, so this requirement must be considered in terms of the entire process.

In this technical field, in relation to the replacement of the above-mentioned raw material, an automated system has been introduced to some extent, but it was difficult to satisfy various requirements, and thus some works had to be done manually, so the work efficiency was not excellent. Therefore, the method of using the bonding tape was required to be supplemented in terms of functionality.

Accordingly, the inventor of the present invention studied a raw material supply device for a separator of a secondary battery capable of solving the above-mentioned problems, and as a result, the present invention was completed.

[Prior Art Document]
[Patent Document]
Korean Laid-open Patent Publication No. 10-2021-0009009

DISCLOSURE

Technical Problem

In order to solve the above problems, it is an object of the present invention to provide a raw material supply device capable of automatically bonding an existing raw material and a supplied raw material using ultrasonic waves, in connection with a roll type raw material for a separator of a secondary battery.

Technical Solution

The present invention provides a raw material supply device for a separator of a secondary battery including: a conveyor configured to move an end portion of a supplied raw material to an end portion of an existing raw material; and a bonding unit configured to bond the end portion of the supplied raw material and the end portion of the existing raw material.

In one embodiment of the present invention, the conveyor comprises a first adsorption pad, a first upper and lower conveying cylinder and a forward and backward conveying cylinder. The adsorption pad adheres and fixes the end portion of the supplied raw material, the first upper and lower conveying cylinder moves the first adsorption pad up and down, and the forward and backward conveying cylinder moves the first adsorption pad forward and backward.

In one embodiment of the present invention, the bonding unit comprises a ultrasonic horn, a second upper and lower conveying cylinder, a second adsorption pad, a third upper and lower conveying cylinder, and a left and right conveying cylinder wherein the ultrasonic horn transfers vibration energy of ultrasonic waves to the supplied raw and bonds the supplied raw material and the existing raw material, wherein the second upper and lower conveying cylinder moves the ultrasonic horn up and down, wherein the second adsorption pad adsorbs and fixes the end portion of the existing raw material, the third upper and lower conveying cylinder moves the second adsorption pad up and down, and wherein the left and right conveying cylinder moves the ultrasonic horn right and left across the end portion of the supplied raw material.

In one embodiment of the present invention, each of the supplied raw material and the existing raw material comprise a separator material and a protective film material, and the first adsorption pad, the first upper and lower conveying cylinder, the forward and backward conveying cylinder and the ultrasonic horn, the second upper and lower conveying cylinder, the second adsorption pad, the third upper and lower conveying cylinder and the left and right conveying cylinder are provided as vertically spaced apart pairs so that the separator material and the protective film material can be individually processed.

In one embodiment of the present invention, the supplied raw material is supplied to the raw material supply device in a state in which the protective film material is coated on the separator material, and after the two first adsorption pads fix the end portion of the separator material and the end portion of the protective film material, respectively, the separator material and the protective film material are separated by the first upper and lower conveying cylinder connected to each of the first adsorption pads.

In one embodiment of the present invention, the separator material discharged through the bonding unit is input to a production line of the secondary battery, the protective film material discharged through the bonding unit is recovered in a form of a roll, and for operational efficiency, the separator material is separated toward an upper part of the raw material supply device, and the protective film material is separated toward a lower part of the raw material supply device.

In one embodiment of the present invention, the first adsorption pad covers opposite edges of the end portion of the supplied raw material and contains an opening through which the ultrasonic horn can move in contact with the supplied raw material.

In one embodiment of the present invention, the supplied raw material is supplied to the conveyor in a roll form, and when the end portion of the supplied raw material R1 adhered to the first adsorption pad is moved to the end portion of the existing raw material by the first upper and lower conveying cylinder and the forward and backward conveying cylinder, the tension of the supplied raw material is maintained between 90% and 110% based on the tension of the supplied raw material in the roll form.

In one embodiment of the present invention, the raw material supply device further comprises a plurality of rollers between the supplied raw material in the roll form and the conveyor, and the plurality of rollers are arranged to define a movement path of the supplied raw material to have a zigzag pattern when the supplied raw material in the roll form is supplied to the conveyor.

In one embodiment of the present invention, the conveyor moves the supplied raw material so to overlap the existing raw material by 5 mm to 20 mm in a longitudinal direction.

In one embodiment of the present invention, the bonding unit is configured to position the ultrasonic horn in contact with the supplied raw material using the second upper and lower conveying cylinder, and to apply ultrasonic waves to the ultrasonic horn to weld the supplied raw material and the existing raw material while moving across the end portion of the supplied raw material using the left and right conveying cylinder.

In one embodiment of the present invention, the frequency of ultrasonic waves applied to the ultrasonic horn is 10 kHz to 50 kHz.

In one embodiment of the present invention, the raw material supply device further comprises an ultrasonic generator configured to generate ultrasonic waves so as to apply ultrasonic waves to the ultrasonic horn.

In one embodiment of the present invention, the raw material supply device further comprises a pneumatic controller and a pneumatic signal generator configured to drive all of the conveying cylinders and the adsorption pads.

Advantageous Effects

The raw material supply device for the separator of the secondary battery according to the present invention can automatically bond the existing raw material and the supplied raw material with respect to the raw material in the form of a roll.

When bonding the existing raw material and the supplied raw material, it is possible to obtain effects such as simplification of the process and improvement of adhesion force by using the ultrasonic welding method without using a tape.

In addition, even for a raw material in the form of a roll supplied with a protective film material coated on the separator material, it does not require special manual work, and it is possible to separate and supply automatically.

DESCRIPTION OF DRAWINGS

FIG. 1 is a view schematically showing the raw material supply device for the separator of the secondary battery according to an embodiment of the present invention.

FIGS. 2a, 2b, and 2c are views showing a contact portion between the first adsorption pad and the supplied raw material according to an exemplary shape of the first adsorption pad.

FIGS. 3a, 3b, 3c, 3d and 3e are views sequentially illustrating a process of driving the raw material supply device for the separator of the secondary battery according to an embodiment of the present invention.

FIGS. 4a and 4b are views showing a plan view (FIG. 4a) and a left side view (FIG. 4b) of an exemplary bonding unit when the supplied raw material and the existing raw material are ultrasonically welded by the ultrasonic horn.

BEST MODE

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible. Therefore, since the configuration shown in the embodiments and drawings described in the present specification is only one of the most preferred embodiments of the present invention, and does not represent all of the technical spirit of the present invention, it should be understood that various equivalents and modifications may be substituted for them at the time of filing the present application.

In the drawings, the size of each component or a specific part constituting the component is exaggerated, omitted, or schematically illustrated for convenience and clarity of description. Therefore, the size of each component does not fully reflect the actual size. If it is determined that a detailed description of a related known function or configuration may unnecessarily obscure the gist of the present invention, such description will be omitted.

The present invention relates to a raw material supply device for a separator of a secondary battery. In order to explain such a raw material supply device, FIG. 1 provides a view schematically showing the raw material supply device for the separator of the secondary battery according to an embodiment of the present invention.

The raw material supply device for the separator of the secondary battery according to an embodiment of the present invention comprises a conveying unit 10 and a bonding unit 20. The conveying unit 10 is a device for moving the end portion of the supplied raw material R1 to the end portion of the existing raw material R2. Here, the 'end portion' means the area from a start line (or end line) in the longitudinal direction (when applied to a device, Machine Direction (MD)) of the supplied raw material R1 or the existing raw material R2 to a line spaced apart by a certain distance, and the certain distance is broadly determined by the line in the width direction (when applied to the device, TD (Transverse Direction)), where the adsorption pads (11, 23) and the supplied raw material R1 or the existing raw material R2 meet, and is narrowly determined by the line in the width direction where the supplied raw material R1 and the existing raw material R2 meet for bonding. The bonding unit 20 is a device for bonding the end portion of the supplied raw material R1 and the end portion of the existing raw material R2. If the bonding unit 20 can cause the end portion of the supplied raw material R1 and the end portion of the existing raw material R2 to be bonded, the bonding means such as heat, ultrasonic waves, and adhesives are not particularly limited. However, as a more effective means, the bonding unit 20 comprises an ultrasonic horn 21 which uses ultrasonic waves.

The conveying unit 10 comprises the first adsorption pad 11, the first upper and lower conveying cylinder 12, and the forward or backward conveying cylinder 13, and may comprise additional components as necessary.

The first adsorption pad 11 is a device for adsorbing and fixing the end portion of the supplied raw material R1. The adsorption method of the first adsorption pad 11 is not particularly limited as long as it has an adhesive property and an easy desorption property at a level that can achieve the object of the present invention, and in consideration of the above functionality, a vacuum adsorption method using air suction may be preferable. The adsorption surface of the first adsorption pad 11 may be designed in various forms, but the functionality of the device of the present invention should be considered. Specifically, the supplied raw material can be initially supplied in the form of a roll, and it is a material that is not rigid. Therefore, it is important that the first adsorption pad 11 covers the two corners present in the end portion of the supplied raw material R1 so as not to be folded, and it is also important that when the supplied raw material R1 moves to the end portion of the existing raw material R2 while being adsorbed on the first adsorption pad, the entire width direction of the supplied raw material R1 is covered so that a constant level of tension can be maintained in the entire area of the supplied raw material R1. Also, in the bonding unit 20, since the supplied raw material R1 and the ultrasonic horn 21 must be in direct contact in order to bond the supplied raw material R1 and the existing raw material R2, the first adsorption pad 11 requires an opening through which the ultrasonic horn can move in contact with the supplied raw material R1. FIGS. 2a, 2b and 2c provide a view showing a cross-section of the contact portion between the first adsorption pad and the supplied raw material, according to the exemplary shape of the first adsorption pad 11 for describing the structure of the first adsorption pad 11. The first adsorption pads according to FIGS. 2a and 2b cover the two edges present in the end portion of the supplied raw material R1, cover the entire width direction of the supplied raw material R1, and secure an area (B) that causes the ultrasonic horn 21 to come into direct contact with the supplied raw material R1 through the opening. The opening is not necessarily limited to a hole shape, and may have a shape opened in one direction as shown in FIG. 2a.

The first upper and lower conveying cylinder 12 is a device for causing the first adsorption pad 11 to move up or down, and the forward or backward conveying cylinder 13 is a device for causing the first adsorption pad 11 to move forward or backward. The supplied raw material R1 adsorbed on the first adsorption pad 11 may be positioned to overlap the existing raw material R2 by the first upper and lower conveying cylinder 12 and the forward or backward conveying cylinder 13. In this case, the first upper and lower conveying cylinder 12 and the forward or backward conveying cylinder 13 do not necessarily operate sequentially, but may operate independently of each other, and thus also may operate simultaneously. When the supplied raw material R1 is adsorbed on the first adsorption pad 11, and then moved to the existing raw material R2, if the first upper and lower conveying cylinder 12 and the forward or backward conveying cylinder 13 operate at the same time so that it is moved in the shortest linear distance, the load applied to the material can be reduced.

The bonding unit 20 comprises the ultrasonic horn 21, the second upper and lower conveying cylinder 22, the second adsorption pad 23, the third upper and lower conveying cylinder 24 and the left and right conveying cylinder 25, and may comprise additional components as necessary.

The ultrasonic horn 21 is a device that transfers the vibration energy of ultrasonic waves to the supplied raw material R1, which is a target for bonding, and bonds the supplied raw material R1 and the existing raw material R2. There may be various methods to bond the supplied raw material R1 and the existing raw material R2. However, the bonding method using ultrasonic waves is used in consideration of the simplification of the components of the device and the quality such as the bonding force after bonding. Since the bonding method using ultrasonic waves is to melt and bond the object using a wave having a high frequency, the "bonding" in the present invention may mean "welding". The frequency of ultrasonic waves applied to the ultrasonic horn 21 for welding by ultrasonic waves can be set differently depending on the material, but may be set within the range of 10 kHz to 50 kHz, preferably 10 kHz to 40 kHz, more preferably 10 kHz to 30 kHz. According to one embodiment of the present invention, when welding the separator material by ultrasonic waves, the frequency of ultrasonic waves may be set in the range of 10 kHz to 40 kHz, preferably 10 kHz to 30 kHz, more preferably 10 kHz to 20 kHz, and when the protective film material is welded by ultrasonic waves, the frequency of ultrasonic waves may be set in the range of 20 kHz to 50 kHz, preferably 20 kHz to 40 kHz, and more preferably 20 kHz to 30 kHz.

The second upper and lower conveying cylinder 22 is a device for causing the ultrasonic horn 21 to move up or down. Since the ultrasonic horn 21 is generally located on top of the supplied raw material R1, the ultrasonic horn comes into contact with the supplied raw material R1 by causing the ultrasonic horn 21 to move downward by the second upper and lower conveying cylinder 22.

The second adsorption pad 23 is a device for adsorbing and fixing the end portion of the existing raw material R2. As in the first adsorption pad 11, the adsorption method of the second adsorption pad 23 is preferably a vacuum adsorption method using air suction. However, in the case of the second adsorption pad, since the end portion of the existing raw material R2 does not move in an adsorbed state, the adhesive property does not need to be as high as the level of the first adsorption pad 11. If the supplied raw material R1 and the existing raw material R2 overlap, they may be arranged in the order of the second adsorption pad 23, the existing raw material R2, the supplied raw material R1 and the first adsorption pad 11. However, since the ultrasonic horn 21 is in contact with the supplied raw material R1 from the side of the first adsorption pad 11, it is not necessary to have an opening for passing the second adsorption pad 23 and the ultrasonic horn 21. Accordingly, the second adsorption pad 23 can easily cover the entire area of the end portion of the existing raw material R2.

The third upper and lower conveying cylinder 24 is a device for causing the second adsorption pad 23 to move up or down. In order to perform a function as a support when bonding the supplied raw material R1 and the existing raw material R2, the second adsorption pad 23 moves upward by the third upper and lower conveying cylinder 24, comes into contact with the end portion of the existing raw material R2, and then adsorbs it. After the bonding of the supplied raw material R1 and the existing raw material R2 is finished, the second adsorption pad 23 moves downward by the third upper and lower conveying cylinder 24, and is desorbed from the existing raw material R2.

The left and right conveying cylinder 25 is a device for causing the ultrasonic horn 21 to move to the right or left side. The left and right conveying cylinder 25 determines the position where the ultrasonic horn 21 initially comes into contact with the supplied raw material R1, and then determines the direction of welding by ultrasonic waves. In the bonding unit 20, a forward or backward conveying cylinder for causing the ultrasonic horn 21 to move forward or backward does not particularly exist. This is because the same purpose can be achieved by causing the supplied raw material R1 and the existing raw material R2 to move forward or backward through the rollers of the device.

The supplied raw material R1 and the existing raw material R2 comprise a separator material and a protective film material, respectively. The separator material may be used without limitation as long as it is a separator material for a secondary battery, which is generally used in the relevant technical field, and exemplarily, polyolefin-based polymers such as polyethylene and polypropylene may be used. In fact, only the separator material is put into the production line of the separator material, but the separator material is generally distributed and supplied in the form of a roll. At this time, the protective film material is attached to one side of the separator material to separate and protect the raw material. The protective film material may be used without limitation as long as it is generally used in the relevant technical field, and exemplarily, polyethylene terephthalate (PET) may be used. Considering the general distribution and supply status of the separator material, a process of removing the protective film material from the separator material is required, and the raw material supply device according to the present invention can automatically perform even the process of removing and recovering the protective film material from the separator material.

If the supplied raw material R1 is supplied to the raw material supply device in a state in which the protective film material is coated on the separator material, after the separator material and the protective film material are separated, their individual treatment is required. In this case, the constitution of the conveying unit 10 comprising the first adsorption pad 11, the first upper and lower conveying cylinder 12 and the forward or backward conveying cylinder 13, and the constitution of the bonding unit 20 comprising the ultrasonic horn 21, the second upper and lower conveying cylinder 22, the second adsorption pad 23, the third upper and lower conveying cylinder 24 and the left and right conveying cylinder 25 should exist by two. In order to efficiently arrange the constitutions that exist by two, it is preferable that the same two constitutions are each separated up and down and are arranged symmetrically about a central axis. This can be confirmed through the conveying unit 10 and the bonding unit 20 as shown in FIG. 1. Since the upper and lower portions are arranged symmetrically with respect to the central axis, the lower portion is described in an inverted state up and down from the case of the upper portion. Exemplarily, in the bonding unit 20 of the upper portion, the second adsorption pad 23 supports the bottom, and on it, the existing raw material R2, the supplied raw material R1, and the first adsorption pad 11 are arranged in this order, and the ultrasonic horn 21 moves from top to bottom, passes through the opening of the first adsorption pad 11 and comes into contact with the supplied raw material R1. On the other hand, in the bonding unit 20 of the lower portion, the second adsorption pad 23 is located at the top, and below it, the existing raw material R2, the supplied raw material R1, and the first adsorption pad 11 are arranged in this order, and the ultrasonic horn 21 moves from bottom to top, passes through the opening of the first adsorption pad 11 and comes into contact with the supplied raw material R1. If the individual processing of the separator material and the protective film material is required, when considering the situation in which the separator material (R2a) discharged through the bonding unit 20 is put into the production line of the secondary battery and the protective film material (R2b) discharged through the bonding unit 20 is recovered in the form of a roll, it may be preferable that for operational efficiency, the separator material is separated from the top of the device (D3) and the protective film material is separated from the bottom of the device (D4).

FIGS. 3a, 3b, 3c, 3d and 3e provide views showing each process in order to explain in detail the process of driving the raw material supply device for the separator of the secondary battery according to an embodiment of the present invention, wherein the supplied raw material R1 coated with the protective film material on the separator material is used.

FIG. 3a shows a state in which the supplied raw material R1 is supplied, and the two first adsorption pads 11 are adsorbed to the separator material and the protective film material, respectively. For the efficiency of work, when the supplied raw material R1 is supplied, the protective film material may be supplied so that it is located below.

FIG. 3b shows a state in which the supplied raw material R1 is separated into the separator material and the protective film material due to the up and down movement of the two first adsorption pads 11. As shown in FIG. 3b, the supplied raw material R1 is separated into a separator material and a protective film material due to the up and down movement of the two first adsorption pads 11 by the first upper and lower conveying cylinder 12, but it is distinct from the forward or backward movement of the first adsorption pad 11, and thus does not have to proceed sequentially. Depending on the structure of the device, the upper and lower movement and the forward or backward movement of the first adsorption pad 11 may be proceeded simultaneously, and if the supplied raw material R1 moves to the existing raw material R2 in the shortest linear distance, the load applied to the material can be reduced. When separating the separator material and the protective film material, if the entire adsorption area of the first adsorption pad 11 and the separator material or the protective film material are separated at once, the material may be damaged, and thus the design of the first adsorption pad 11 can be changed so that it can be sequentially separated from the starting line in the longitudinal direction (MD) of the supplied raw material R1. Exemplarily, the first adsorption pad 11 is composed of several nodes instead of one so that it has a structure that can be sequentially separated from the starting line of the supplied raw material R1, or the first adsorption pad 11 may have a structure in which the adsorption of the first adsorption pad 11 is not applied with the same intensity over the entire adsorption surface, but is sequentially applied from the part close to the starting line of the supplied raw material R1.

FIG. 3c shows a state in which the end portion of the supplied raw material R1 and the end portion of the existing raw material R2 are positioned to overlap by causing the supplied raw material R1 separated into the separator material and the protective film material to move forward or backward of the first adsorption pad 11. When the supplied raw material R1 is supplied in the form of a roll, it has a certain level of tension suitable for application to the production line. Even through the raw material supply device according to the present invention, it is desirable that such tension be maintained. When the supplied raw material R1 is adsorbed on the first adsorption pad 11 and moves to the existing raw material R2, a change in tension may occur. However, by setting the upper and lower movement speed and forward or backward movement speed of the first adsorption pad 11 to match the change in tension, even if the end portion of the supplied raw material R1 moves to the end portion of the existing raw material R2, the tension of the supplied raw material can be maintained at 90% to 110%, based on the tension of the supplied raw material in the form of a roll. The end portion of the supplied raw material R1 and the end portion of the existing raw material R2 may overlap at 5 mm to 20 mm in the longitudinal direction by the forward or backward movement of the first adsorption pad 11. If the end portion of the supplied raw material R1 and the end portion of the existing raw material R2 can be strongly bonded without breaking, not only in the raw material supply device according to the present invention, but also in the production line of the secondary battery, the smaller the overlapping area of the end portion of the supplied raw material R1 and the end portion of the existing raw material R2, the more preferable. In the raw material supply device according to the present invention, when the supplied raw material R1 and the existing raw material R2 are bonded, if the welding by ultrasonic waves is used, a strong bonding force can be expressed even with a small welding area, and thus the overlapping area of the supplied raw material R1 and the existing raw material R2 can be set small.

FIG. 3d shows a state in which the supplied raw material R1 and the existing raw material R2 are welded by placing the ultrasonic horn 21 on the supplied raw material R1 in the overlapping portion of the supplied raw material R1 and the existing raw material R2 and applying ultrasonic waves to the ultrasonic horn 21. At this time, the ultrasonic horn 21 passes through the opening of the first adsorption pad 11, and then is positioned so as to be in contact with the supplied raw material R1 on the other surface of the overlapping portion of the supplied raw material R1 and the existing raw material R2. A specific driving direction of the ultrasonic horn 21 after this will be described supplementarily with reference to FIGS. 4a and 4b.

FIG. 3e shows the operating state of the device after bonding the supplied raw material R1 and the existing raw material R2. The first adsorption pad 11 and the second adsorption pad 23 desorb the supplied raw material R1 and the existing raw material R2, respectively, and move to the initial position where the flow of the raw material is not obstructed. Similarly, the ultrasonic horn 21 also moves upward and waits until the next replacement of the raw material. If the supplied raw material is all exhausted, a new supplied raw material is introduced in a state where the end is fixed by the second adsorption pad 23, and the processes starting from FIG. 3a are repeated again.

Although the symmetrically configured lower portion has not been specifically described in the description of FIGS. 3a, 3b, 3c, 3d and 3e, it is not different from the description of the upper portion except that the upper and lower positions are reversed to each other.

FIGS. 4a and 4b provide views showing a top view (FIG. 4a) and a left side view (FIG. 4b) of an exemplary bonding unit when the supplied raw material R1 and the existing raw material R2 are welded by ultrasonic waves with the ultrasonic horn 21 in order to describe the welding process by ultrasonic waves in the bonding unit 20 in detail.

As shown in FIG. 4a, the ultrasonic horn 21 is located in contact with the supplied raw material R1 at one end of the opening of the first adsorption pad 11, and welds the supplied raw material R1 and the existing raw material R2 while moving left and right (D5) in the width direction by the left and right conveying cylinder 25. The left and right movement can be performed repeatedly, and it is possible to repeatedly perform ultrasonic welding in the same position by the repeated left and right movement, and an additional ultrasonic welding can be performed by causing the overlapping part to move forward or backward through the roller of the device. The ultrasonic welding is performed to cover the widest possible range based on the width direction.

The raw material supply device according to the present invention may comprise additional components as shown in FIG. 1 if necessary. Among the additional components, components closely related to the functionality of the device will be supplementarily described below, but the additional components are not necessarily limited to these components.

The raw material supply device further comprises a plurality of rollers 31 between the supplied raw material in the form of a roll and the conveying unit 10. When the supplied raw material in the form of a roll is supplied to the conveying unit 10, a movement path of the supplied raw material may be determined by the plurality of rollers 31. The plurality of rollers 31 help the supplied raw material to maintain a certain level of tension by causing the movement path of the supplied raw material to form a zigzag pattern. These rollers 31 are also utilized to control the movement path of the separator material or the protective film material discharged through the bonding unit 20.

The raw material supply device further comprises an ultrasonic generator 32 for generating ultrasonic waves so as to apply ultrasonic waves to the ultrasonic horn 21. The ultrasonic generator 32 serves to convert electrical energy into a form suitable for application to the ultrasonic horn. If the ultrasonic generator 32 can implement at a level of vibration energy capable of achieving the object of the present invention in the ultrasonic horn, the type thereof is not particularly limited.

The raw material supply device further includes a pneumatic controller 33 and a pneumatic signal generator 34. In the raw material supply device, components such as the conveying cylinder and the adsorption pad can be driven by pneumatic pressure, and this pneumatic pressure is controlled by the pneumatic controller 33 and the pneumatic signal generator 34.

In the above, although the present invention has been described with reference to limited embodiments and drawings, the present invention is not limited thereto, and also it is apparent that various modifications and variations can be made by those of ordinary skill in the art to which the present invention pertains within the scope of equivalents of the technical spirit of the present invention and the claims to be described below.

Description of Symbol

10: Conveying unit, 11: First adsorption pad,
12: First upper and lower conveying cylinder, 13: Forward or backward conveying cylinder,
20: Bonding unit, 21: Ultrasonic horn,
22: Second upper and lower conveying cylinder, 23: Second adsorption pad,
24: Third upper and lower conveying cylinder, 25: Left and right conveying cylinder,
31: Roller, 32: Ultrasonic generator,
33: Pneumatic controller, 34: Pneumatic signal generator,
35: Frame, R1: Supplied raw material,
R2: Existing raw material, R2a: Existing separator material,
R2b: Existing protective film material, D1: Unwinding direction of roll (Supply of supplied raw material), D2: Supplying direction of supplied raw material, D3: Input direction of separator material to mass production line,
D4: Winding direction of roll (Recovery of protective film material)
D5: Movement direction of ultrasonic horn (Welding direction by ultrasonic waves)
A: Contact area between supplied raw material and first adsorption pad
B: Non-contact area between supplied raw material and first adsorption pad formed by opening
O: Overlapping part of supplied raw material and existing raw material

The invention claimed is:

1. A raw material supply device for a separator of a secondary battery comprising:
 a conveyor configured to move an end portion of a supplied raw material to an end portion of an existing raw material; and
 a bonding unit including a first bonding station and a second bonding station, each bonding station configured to respectively bond the end portion of a first component of the supplied raw material and the end portion of a first component of the existing raw material and a second component of the supplied raw material and the end portion of a second component of the existing raw material.

2. The raw material supply device for the separator of the secondary battery according to claim 1, wherein the conveyor comprises a first adsorption pad, a first upper and lower conveying cylinder and a forward and backward conveying cylinder,
 wherein the adsorption pad is configured to adhere to and fix the end portion of the supplied raw material,
 wherein the first upper and lower conveying cylinder is configured to move the first adsorption pad up and down, and
 wherein the forward and backward conveying cylinder is configured to move the first adsorption pad forward and backward.

3. The raw material supply device for the separator of the secondary battery according to claim 2, wherein the bonding unit comprises an ultrasonic horn, a second upper and lower conveying cylinder, a second adsorption pad, a third upper and lower conveying cylinder, and a left and right conveying cylinder,
 wherein the ultrasonic horn is configured to transfer vibration energy of ultrasonic waves to the supplied raw material to bond the supplied raw material and the existing raw material,
 wherein the second upper and lower conveying cylinder is configured to move the ultrasonic horn up and down,
 wherein the second adsorption pad is configured to adhere to and to fix the end portion of the existing raw material,
 wherein the third upper and lower conveying cylinder is configured to move the second adsorption pad up and down, and
 wherein the left and right conveying cylinder is configured to move the ultrasonic horn right and left across the end portion of the supplied raw material.

4. The raw material supply device for the separator of the secondary battery according to claim 3, wherein the each of the supplied raw material and the existing raw material comprises a separator material as the first component and a protective film material as the second component, and
 wherein the first adsorption pad, the first upper and lower conveying cylinder, the forward and backward conveying cylinder, the ultrasonic horn, the second upper and lower conveying cylinder, the second adsorption pad, the third upper and lower conveying cylinder and the left and right conveying cylinder are provided as vertically spaced apart pairs so that the separator material and the protective film material can be individually processed.

5. The raw material supply device for the separator of the secondary battery according to claim 4, wherein the supplied raw material is supplied to the raw material supply device in a state in which the protective film material is coated on the separator material, and
 wherein the raw material supply device is configured to be operated such that the pair of first adsorption pads fix the end portion of the separator material and the end portion of the protective film material, respectively, and then the separator material and the protective film material are separated by the first upper and lower conveying cylinder connected to each of the first adsorption pads.

6. The raw material supply device for the separator of the secondary battery according to claim 5, wherein the separator material discharged through the bonding unit is input to a production line of the secondary battery,
 wherein the protective film material discharged through the bonding unit is recovered in a form of a roll, and
 wherein the separator material is separated toward an upper part of the raw material supply device and the protective film material is separated toward a lower part of the raw material supply device.

7. The raw material supply device for the separator of the secondary battery according to claim 2, wherein the first adsorption pad is configured to cover opposite edges of the end portion of the supplied raw material, and first adsorption pad includes an opening through which the ultrasonic horn can move in contact with the supplied raw material.

8. The raw material supply device for the separator of the secondary battery according to claim 2, wherein the supplied raw material is supplied to the conveyor in a roll form, and
 wherein, when the end portion of the supplied raw material adhered to the first adsorption pad is moved to the end portion of the existing raw material by the first upper and lower conveying cylinder and the forward and backward conveying cylinder, the tension of the supplied raw material is maintained at 90% to 110% based on the tension of the supplied raw material in the roll form.

9. The raw material supply device for the separator of the secondary battery according to claim 8, wherein the raw material supply device further comprises a plurality of rollers between the supplied raw material in the roll form and the conveyor, and
- wherein the plurality of rollers are arranged to define a movement path of the supplied raw material to have a zigzag pattern when the supplied raw material in the roll form is supplied to the conveyor.

10. The raw material supply device for the separator of the secondary battery according to claim 3, wherein the conveyor is configured to move the supplied raw material so as to overlap the existing raw material by 5 mm to 20 mm in a longitudinal direction.

11. The raw material supply device for the separator of the secondary battery according to claim 10, wherein the bonding unit is configured to:
- position the ultrasonic horn in contact with the supplied raw material using the second upper and lower conveying cylinder; and
- apply ultrasonic waves to the ultrasonic horn to weld the supplied raw material to the existing raw material while moving across the end portion of the supplied raw material using the left and right conveying cylinder.

12. The raw material supply device for the separator of the secondary battery according to claim 11, wherein the frequency of ultrasonic waves applied to the ultrasonic horn is 10 kHz to 50 kHz.

13. The raw material supply device for the separator of the secondary battery according to claim 3, wherein the raw material supply device further comprises an ultrasonic generator configured to generate ultrasonic waves so as to apply ultrasonic waves to the ultrasonic horn.

14. The raw material supply device for the separator of the secondary battery according to claim 3, wherein the raw material supply device further comprises a pneumatic controller and a pneumatic signal generator configured to drive all of the conveying cylinders and the adsorption pads.

* * * * *